J. P. GERAGHTY & G. W. NAYLOR.
CAR FENDER.
APPLICATION FILED AUG. 10, 1912.
1,090,295.  Patented Mar. 17, 1914.
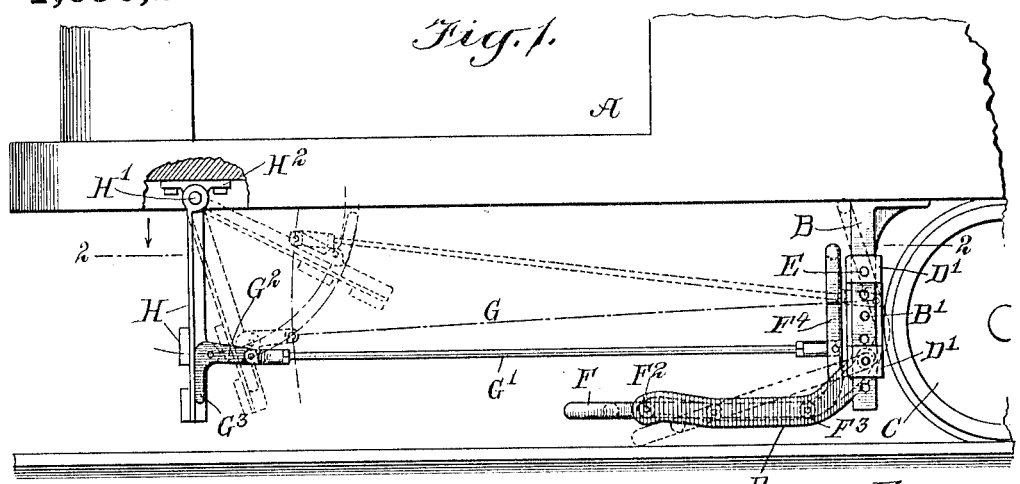
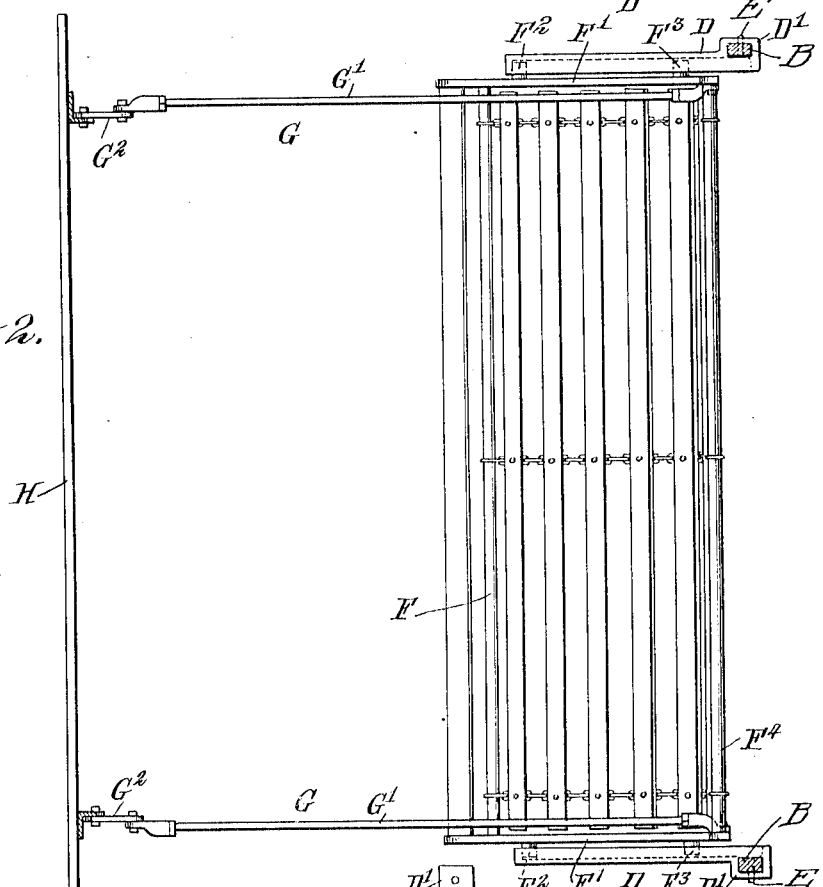
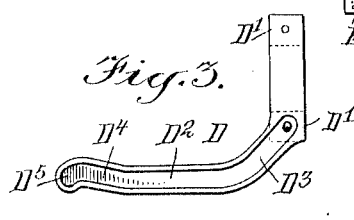
WITNESSES
INVENTORS
John P. Geraghty
George W. Naylor
BY
ATTORNEYS

UNITED STATES PATENT OFFICE.

JOHN P. GERAGHTY AND GEORGE WILLIAM NAYLOR, OF JERSEY CITY, NEW JERSEY, ASSIGNORS OF FORTY-FIVE ONE-HUNDREDTHS TO EDWARD C. CURRY AND CHARLES A. STONEHAM, OF NEW YORK, N. Y.

CAR-FENDER.

1,090,295.   Specification of Letters Patent.   Patented Mar. 17, 1914.

Application filed August 10, 1912. Serial No. 714,398.

*To all whom it may concern:*

Be it known that we, JOHN PARKER GERAGHTY and GEORGE WILLIAM NAYLOR, both citizens of the United States, and residents of Jersey City, in the county of Hudson and State of New Jersey, have invented a new and Improved Car-Fender, of which the following is a full, clear, and exact description.

The invention relates to car fenders arranged under the car platform immediately in front of the wheels and connected with a gate at the forward end of the platform.

The object of the invention is to provide a new and improved car fender more especially designed for use on surface cars and arranged to normally hold the apron frame a distance above the track with a view to clear switches, paving stones and the like, to cause the apron frame to move in an inclined position on a person or other object falling onto the track and being struck by the gate, and to immediately cause the apron frame to swing back into normal position as soon as the person or other object passes onto the apron frame, thus preventing such person or object from being run over or from being injured by preventing a hand or a foot from passing under the apron frame.

For the purpose mentioned, use is made of a gate at the front end of the car and an apron frame arranged a distance in the rear of the said gate and normally in an approximately horizontal position a distance above the track, the said apron frame being connected with said gate to move simultaneously with the latter and the said apron frame being mounted to move bodily rearwardly into an inclined position with the front end of the apron frame downward in close proximity to the track whenever an obstruction is struck by the gate during the forward motion of the car.

A practical embodiment of the invention is represented in the accompanying drawings forming a part of this specification, in which similar characters of reference indicate corresponding parts in all the views.

Figure 1 is a side elevation of the car fender with the parts in normal position and with the car fender applied to a street car, part of which is shown in section; Fig. 2 is a sectional plan view of the car fender on the line 2—2 of Fig. 1; and Fig. 3 is a side elevation of one of the guideways for the apron frame.

To the under side of the car body A are attached depending hangers B located immediately in the front of the wheels C and engaged by eyes $D'$, $D'$ of guideways D, the eyes $D'$ being secured on the hangers B by pins E passing transversely through the eyes and through apertures $B'$ arranged on the hangers B to permit of adjusting the guideways D up and down on the hangers with a view to locate the guideways the desired distance above the track on which the car is running. Each of the guideways D is provided with guide grooves having an approximately horizontal portion $D^2$, a rearwardly and upwardly inclined rear portion $D^3$, a slightly forwardly and upwardly inclined front portion $D^4$ and a slightly dropped pocket $D^5$ at the forward end of the front portion $D^4$ (see Fig. 3). An apron frame F of any approved construction is arranged between the guideways D, and the said apron frame is provided with side arms $F'$ provided with spaced pins or rollers $F^2$, $F^3$ engaging the grooves formed in the guideways D with a view to support the apron frame F on the said guideways and to allow bodily movement of the apron frame F, as hereinafter more fully explained. The apron frame F is provided at the rear with a vertical portion $F^4$ connected at each side by a link connection G with a gate H fulcrumed at its upper end at $H'$ on brackets $H^2$ attached to the under side of the car body A at the front end thereof, as plainly indicated in Fig. 1. Each of the link connections G is formed of an apron frame link $G'$ pivotally connected at its rear end with the vertical portion $F^4$ of the apron frame F, and the forward end of the link $G'$ is connected with a gate link $G^2$ pivoted on the gate H and provided with a depending member $G^3$ resting against the inner side of the gate H, as plainly shown in Fig. 1.

When the apron frame F is in normal horizontal position the front pins or rollers $F^2$ are in the pockets $D^5$, while the rear pins or rollers $F^3$ are at the rear ends of the horizontal portions $D^2$ of the guideways D, as plainly indicated in Fig. 1, so that the apron frame F is held normally in an approximately horizontal position. When the apron frame F is in this position the pivotal connection of the links G', G² is below the pivotal connection of the links G' and G² with the apron frame F and the gate H, respectively, and the depending members G³ and the links G² are in engagement with the gate H. When the car is running and the gate H strikes an obstruction in the track then the gate H swings rearwardly and upwardly, and in doing so the link connections G impart a rearward bodily motion to the apron frame F whereby the rollers F³ travel up the rear inclined portions D³ of the guideways D while the front rollers F² pass out of the pockets D⁵ and travel down the front portions D⁴ into the horizontal portions D² so that the apron frame F assumes a rearwardly and upwardly inclined position with the front end of the apron frame in close proximity to the track, as plainly indicated in Fig. 1. Thus by the arrangement described the apron frame F moves simultaneously with the gate H so that the apron frame F is in the inclined receiving position prior to the object reaching the front end of the apron frame, whereby the object must necessarily pass onto the apron frame without danger of a foot or a hand being caught under the forward end of the said frame. When the object passes onto the apron frame the weight of the object causes the apron frame to slide forward, back into a horizontal position, thus lifting the returning apron frame to normal position with the object safely supported thereon.

It is understood that when the gate H swings rearwardly and has moved the apron frame F into inclined receiving position then a further rearward and upward swinging motion given to the gate H by the object causes the links G', G² to open up whereby the gate H is free to swing farther rearwardly and upwardly to allow the object to pass under the gate and to finally pass onto the inclined apron frame F, as previously described.

It is also understood that when the links G', G² open the apron frame F is not further affected by the link connection and the gate H swinging into uppermost position, and the apron frame F is free to move forward, back into horizontal position, by the weight of the object in the frame, as above explained.

When the apron frame F is in a normal horizontal position with the rollers F² in engagement with the pockets D⁵, then the apron frame is not liable to be moved out of this position by the jolting or jarring of the cars, but when an object is struck by the gate H and the latter swings rearwardly, then a simultaneous movement is given to the apron frame F to move the latter into the inclined receiving position and to allow the gate H to swing farther up so as to permit the object to clear the gate and to pass onto the apron frame.

Having thus described our invention, we claim as new and desire to secure by Letters Patent:

1. A car fender, comprising a gate at the front end of the car, and an apron frame arranged a distance in the rear of the said gate and normally in an approximately horizontal position above the track, the said apron frame being connected with the said gate and adapted to move simultaneously with the latter and the said apron frame being mounted to move bodily rearwardly and into an inclined position with the front end of the apron frame downward in close proximity with the track when the gate strikes an obstruction during the forward motion of the car and to be returned to horizontal position by the weight of the obstruction on the apron frame.

2. A car fender comprising a swing gate at the front end of the car, an apron frame located a distance in the rear of the said gate, a connection between the said gate and the said apron frame adapted to move the latter bodily rearward on the said gate striking an obstruction during the forward movement of the car, and guideways for the apron frame, said guideways being so constructed and the apron frame so mounted therein that the apron frame will be normally held in approximately horizontal position, will be moved bodily rearward and into an inclined position with the front end of the apron frame in close proximity to the track, when the gate strikes an obstruction, and be returned to normal position by the weight of the obstruction on the apron frame.

3. A car fender comprising a gate suspended from the front end of the car and mounted to swing rearwardly, fixed guideways having rearwardly and upwardly inclined rear portions, an apron frame having at each end projections working in the guideways, one of the projections being at the rear of the frame and the other adjacent its forward end, and a link connecting the gate with the apron frame, whereby the apron frame will be normally held in a horizontal position, and will move bodily, rearwardly and into an inclined position when the gate strikes an obstruction and be returned to horizontal position by the weight of the obstruction on the apron frame.

4. A car fender, comprising a gate suspended from the front end of the car and mounted to swing rearwardly, fixed guideways in the rear of the gate, an apron frame having projections at its ends working in the guideways, an angular link pivoted to the gate with one member engaging the gate, and a link pivoted to the first link and to the apron frame.

5. A car fender, comprising a gate suspended from the front end of a car and mounted to swing rearwardly, an apron frame arranged a distance in the rear of the said gate and provided at each side with spaced guiding and supporting members, guideways held on the car and each having an approximately horizontal portion a slightly upwardly inclined forward portion and a rear portion inclined upwardly and rearwardly from the rear end of the said horizontal portion, the said guiding and supporting members engaging the said guide-ways, and a connection between the said gate and the said apron frame to normally hold the apron frame in an approximately horizontal position and to move the apron frame rearwardly and into an upwardly and rearwardly inclined position when the gate strikes an object during the forward movement of the car.

6. A car fender, comprising a gate suspended from the front end of a car and mounted to swing rearwardly, an apron frame arranged a distance in the rear of the said gate and provided at each side with spaced guiding and supporting members, guideways held on the car and each having an approximately horizontal position, and a rear portion inclined upwardly and rearwardly from the rear end of the said horizontal portion, the said guiding and supporting members engaging the said guideways, and a connection between the said gate and the said apron to normally hold the apron frame in an approximately horizontal position and to move the apron frame rearwardly and into an upwardly and rearwardly inclined position when the gate strikes an object during the forward movement of the car, the said connection being formed of a gate link connected with the gate and an apron frame link connected with the apron frame and with the said gate link, the latter having an angular member adapted to engage the gate.

7. A car fender, comprising a gate suspended from the front end of a car and mounted to swing rearwardly, an apron frame arranged a distance in the rear of the said gate, and provided at each side with spaced guiding and supporting members, guideways held on the car and each having an approximately horizontal portion, a forward portion slightly inclined upwardly and forwardly from the forward end of the said horizontal portion, the front terminal of the front portion forming a slightly depending pocket, and a rear portion inclined upwardly and rearwardly from the rear end of the said horizontal portion, the said guiding and supporting members engaging the said guideways, and a connection between the said gate and the said apron frame to normally hold the apron frame in an approximately horizontal position and to move the apron frame rearwardly and into an upwardly and rearwardly-inclined position when the gate strikes an object during the forward movement of the car.

In testimony whereof we have signed our names to this specification in the presence of two subscribing witnesses.

JOHN P. GERAGHTY.
GEORGE WILLIAM NAYLOR.

Witnesses:
ALFRED H. DAVIS,
PHILIP D. ROLLHAUS.

---

Copies of this patent may be obtained for five cents each, by addressing the "Commissioner of Patents, Washington, D. C."